Figure 1:
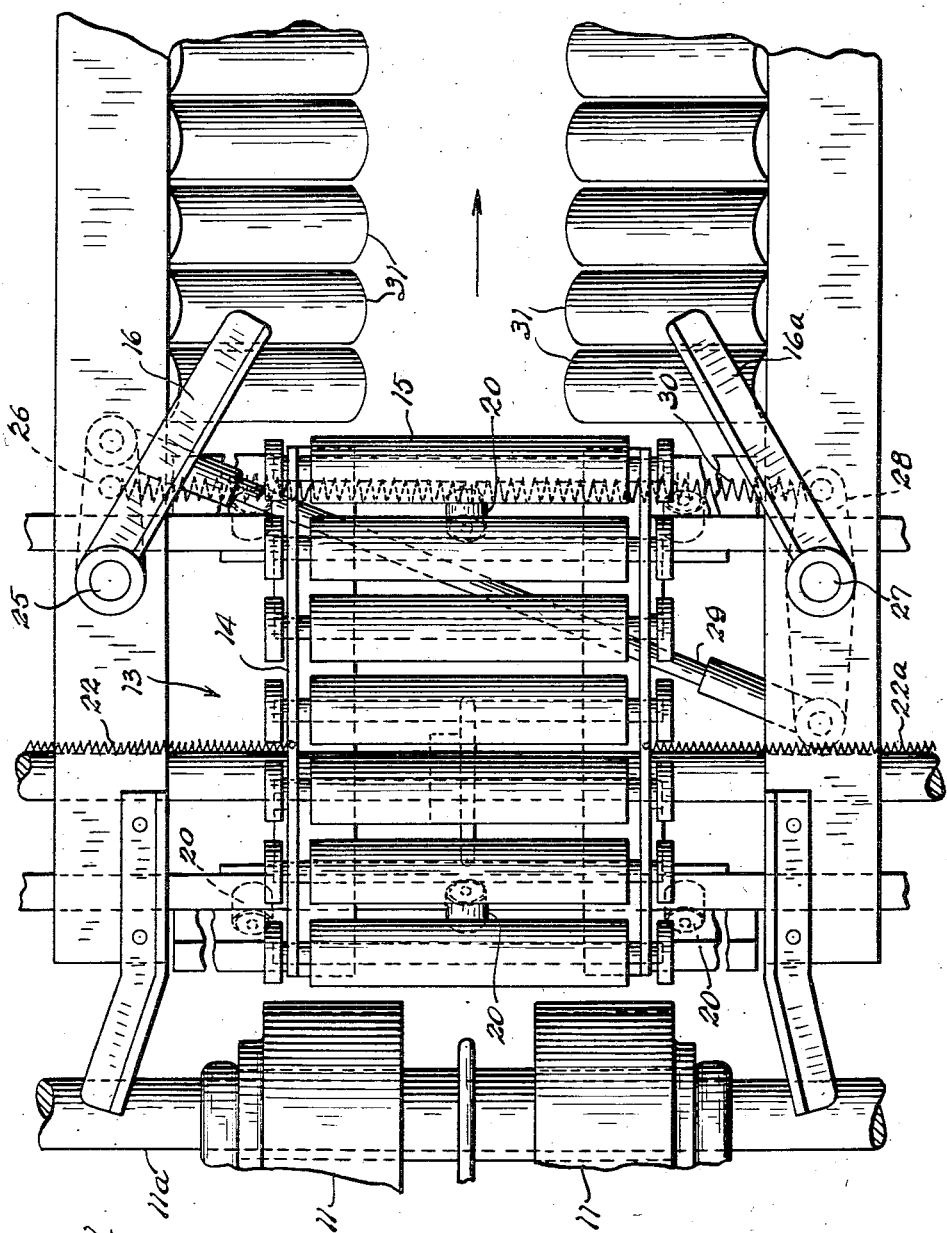

Feb. 12, 1957  R. C. TALBOT ET AL  2,781,119
PACKAGE ALIGNING APPARATUS
Filed May 13, 1954  2 Sheets-Sheet 1

INVENTORS.
Richard C. Talbot &
BY Cyril A. Parnica
Thiess, Olson, Mecklenburger,
von Holst, & Coltman. Attys.

Feb. 12, 1957    R. C. TALBOT ET AL    2,781,119
PACKAGE ALIGNING APPARATUS
Filed May 13, 1954    2 Sheets-Sheet 2

INVENTORS.
Richard C. Talbot &
BY Cyril A. Pavenica
Thiess Olsen, Mecklenburger,
van Holst, & Coltman.

United States Patent Office 2,781,119
Patented Feb. 12, 1957

2,781,119

PACKAGE ALIGNING APPARATUS

Richard C. Talbot and Cyril A. Pavnica, Joliet, Ill., assignors to J. L. Ferguson Company, Joliet, Ill., a corporation of Illinois Application May 13, 1954, Serial No. 429,503

7 Claims. (Cl. 198—29)

This invention relates to apparatus for aligning packages in a file, and it is an object of the invention to provide improved apparatus of that character.

Where packages are fed in file to a machine which is to operate on such packages in any manner, for example by closing and sealing such packages, it is generally necessary to feed the packages to such machine in alignment. Frequently the supply file is not accurately aligned and must be so aligned before the desired operations are performed on the successive packages. Relatively lightweight packages may be aligned by simple guide means while the packages are carried by a friction conveyor means such as a conveyor belt. A relatively insignificant amount of power is needed to move such lightweight packages laterally on the conveyor belt, and the packages are well able to withstand the lateral thrust which drives them into alignment.

However, where heavy packages are being handled, for example large cartons filled with metallic articles such as nuts and bolts, the packages might not be able to withstand the lateral forces necessary to slide the packages laterally on friction conveyor means. Furthermore, such sliding of heavy packages to bring them into alignment is wasteful of power in significant quantity. Still further, such heavy packages may be forced askew by the aligning force.

According to one embodiment of the present invention, a carriage having conveyor rollers is provided, the entire carriage being freely movable laterally of the general direction of package conveying. Individual packages are aligned or centered while passing over the carriage, the lateral aligning force applied to the package causing lateral movement of the carriage along with the package. The packages may therefore be aligned or centered without substantial resistance to the necessary lateral movement of the packages. According to another feature of the invention the same aligning or centering apparatus is able to handle packages of differing widths without adjustment.

Accordingly, it is another object of the invention to provide apparatus for aligning or centering packages in a longitudinal moving file, which apparatus permits the lateral movement of such packages necessary to such alignment with a relatively insignificant lateral force.

It is another object of the invention to provide apparatus of such character which is adapted to handle packages of differing widths.

It is another object of the invention to provide apparatus of the character described above which is reliable, efficient and inexpensive to manufacture.

This invention, together with further objects and advantages thereof, will best be understood by reference to the following description taken in connection with the accompanying drawings, and its scope will be pointed out in the appended claims.

Figure 2:
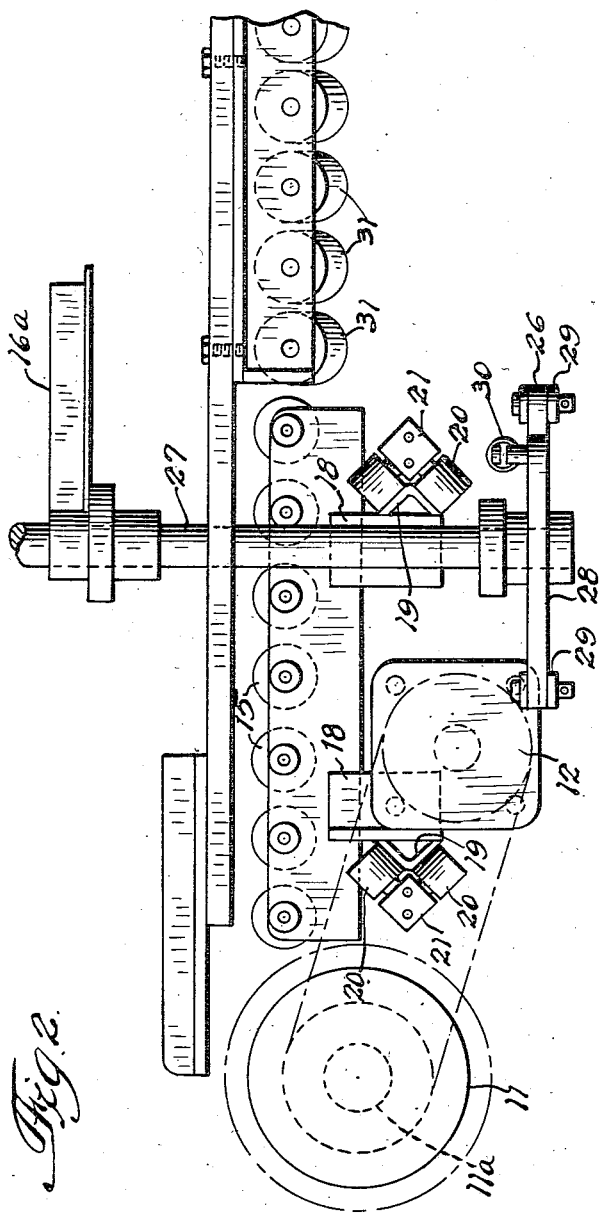

In the drawings, in which like parts are designated by like reference numerals,

Fig. 1 is a plan view of apparatus constructed in accordance with one embodiment of the invention; and Fig. 2 is an elevational view of the same apparatus.

Packages may be fed to and/or through the machine which constitutes the present invention either manually or by any suitable conveyor apparatus such as a pair of carrier chains with transverse flights secured thereto. Such apparatus is common in the art and is not shown in the drawings. The packages as fed to the machine may not be accurately aligned, and it is the purpose of the machine shown in Figs. 1 and 2 to bring the packages into alignment, even though they may be large, heavy packages. The machine may, without adjustment, accomplish alignment of packages of differing sizes.

As the successive packages are fed to the machine they move over a pair of rollers 11 mounted on a shaft 11a. If a feed conveyor is employed which moves the packages only up to the rollers 11, the shaft 11a is preferably power driven as by a power source 12, see Fig. 2. The packages pass from the rollers 11 onto a carriage 13, which includes a box-like frame having at least its upper surface open. Forming a part of this framework is a pair of side plates 14 in which rollers 15 are mounted for free rotation. The packages continue in their movement to the right while carried by the rollers 15, such movement being supplied by the conventional chain and flight conveyor apparatus suggested above, or the side plates 14 may be tilted such that the rollers 15 provide a slightly downhill course for the packages.

Near the right-hand end of the carriage 13 is a pair of guide members 16 and 16a which serves to funnel the successive packages into a given line of movement. The guide members 16 are so located with respect to the carriage 13 that any lateral movement which must be imparted to the successive packages in order to arrange them in the desired line of movement takes place while the packages are carried by the carriage 13.

The carriage 13 is arranged for free movement laterally of the general line of movement of the file of packages, whereby the necessary lateral movement of the packages to arrange them accurately in alignment is accomplished without lateral movement of the packages with respect to the carriage. Adjacent the forward and rearward ends of the side plates 14 are pairs of arms 18, each pair of arms supporting an angle iron 19 which serves as a track.

For each angle iron or track 19 there are provided three rollers 20. In each instance it will be noted that the center roller is arranged to engage the upper surface of the corresponding track 19 while the end rollers are arranged to contact the lower surface of the corresponding track. These rollers are mounted for free rotation on members 21 which are secured to or form a part of the frame of the over-all machine.

It will now be seen that the carriage 13, supported by the rollers 20 through the tracks 19, may move freely in either direction laterally of the line of movement of the packages. Accordingly, when a package carried by the carriage 13 strikes one of the guide members, for example the right-hand guide member 16a, this guide member directs the package to the left. The package, instead of being required to slide on the rollers 15 or other conveyor, transmits a lateral force to the carriage whereby the carriage, along with the package, moves to the left and the package is brought to the desired line of travel without substantial friction.

It will be noted that if a series of packages were to reach the carrier 13, all displaced to the right, the carriage 13 would necessarily move repeatedly to the left; in other words, the error in the original positioning of the successive packages would be accumulative. The carriage would therefore ultimately be removed to the left to an extent that it must engage suitable stops to retain it in package receiving position.

In order to avoid this accumulation, in the carriage, of the error in the original position of the successive packages, springs 22 and 22a are provided for returning the carriage 13 to a neutral or central position following the passage of each successive package thereacross. These springs are secured at their inner ends to the side plates 14 and at their outer ends to any convenient frame members of the over-all machine. In order that these springs 22 may be effective in returning the carriage to a neutral position after the passage of each successive package, it is necessary that the packages as fed to the carriage be so spaced apart that each package passes free of the carriage before the arrival of the next succeeding package. Where the suggested chain and flight conveyor apparatus is employed, this can be accomplished by proper spacing of adjacent flights. Where packages are fed only up to the machine, power driving of the feed rollers 11 can accelerate the successive packages to produce the necessary spacing.

The guide members 16 and 16a are so arranged that packages of differing widths may be accommodated without adjustment of the apparatus. To this effect, the guide member 16 is secured to a rotatable shaft 25 and at the lower end of that shaft an arm 26 is secured. The guide member 16a is similarly secured to a rotatable shaft 27 to which there is also secured an arm 28. A link 29 is pivotally connected to the forward end of the arm 26 and to the rearward end of the arm 28, whereby outward movement of either one of the guide members 16 or 16a necessarily causes a symmetrical outward movement of the other of the guide members. A tension spring is secured at its opposite ends to the forward extending portions of the arms 26 and 28. This spring urges both of the guide members inwardly. It will readily be seen that a package which is driven between the two guide members (which latter move outwardly only a sufficient distance to permit the passage of the package therebetween) will necessarily be centered with respect to the machine.

Attention is directed to the fact that the spring 30 is substantially stronger than the springs 22 and 22a. Accordingly, when a package bears against one of the guide members, for example the member 16, the spring 30 urging the guide member 16 inwardly is of sufficient strength that further forward movement of a package will cause the carriage 13 to move to the right with the package rather than causing outward movement of the guide member 16. This continues until the package is centered, at which time it bears against both of the guide members. Further forward movement of the package then moves the two guide members outwardly against the action of the spring 30 to such an extent that the package may pass therebetween. The package will therefore exit between the guide members with its center line travelling along a definite central path, each successive package following in accurate alignment.

Rollers 31 are shown for receiving successive packages as they emerge from between the guide members. These rollers are shown with their axes sloped for the purpose of facilitating subsequent opening of the lower outer case flaps for application of glue.

The operation of the machine may best be explained by description of the passage of a single package. Let it be assumed that a package is delivered to the carriage 13 over the rollers 11, this package being larger than the minimum opening between the guide members 16 and 16a, and being positioned to the right of center. As this package progresses along the carriage 13 the right-hand forward corner of the package engages the guide member 16a. At this time the forces which move the package forward urge the guide member 16a to pivot outwardly, these forces being resisted by spring 30 which urges both guide members inwardly. The lateral component of the force directed by the package against the guide member 16a is balanced by a lateral force exerted by the guide member against the package and against the carriage 13 upon which it rests. Since the spring 30 which urges the guide members inwardly is stronger than the spring 22a which urges the carriage 13 to its central position, the result of these counteracting forces is that the package, along with the carriage 13, is moved to the left as the package progresses forwardly.

This movement continues until the package is centered, at which time the forward left-hand corner of the package engages the left-hand guide member 16. Further forward movement of the package drives the two guide members apart against the action of the spring 30, the package and the carriage 13 remaining centered. Finally, the package emerges from between the two guide members and passes onto the rollers 31 in centered position.

It will be apparent that a larger package would be handled in the same basic manner, with the exception that such a package would force the two guide members further outwardly as it emerges from between the guide members. A package of minimum width (one whose lateral dimension is equal to the space between the tips of the two guide members when they are in their inwardmost position) would strike one of the guide members with its corresponding forward edge and that forward edge would ride along the engaged guide member as the package moves forwardly and as the carriage moves laterally. This would continue until that forward edge passes beyond the tip of the engaged guide member. At this time the package would just fill the space between the guide members which, in this instance, would not move outwardly.

It will now be seen that the machine described will align even very heavy packages with only a light force applied to the packages for producing the desired package movement laterally of the general line of movement. Also, the machine will, without adjustment, handle packages of differing widths. Where the latter feature is desired, the free lateral movement of the packages is of particular importance, since frictional lateral movement of heavy packages would require that the spring 30 which urges the guide arms 16 and 16a inwardly be very strong. This, of course, would add still further to the power required to drive a package through the machine.

The articles handled by the machine may be filled cases or boxes, or they may be any article which lends itself to handling by the described machine or variations thereof, whether or not the article is wrapped or encased. Where the term "package" is employed herein it is intended that it be given this broad interpretation.

The invention having thus been described, what is claimed and desired to be secured by Letters Patent is:

1. In apparatus for aligning packages moving generally in single file, a carriage for receiving packages of said file, conveyor means mounted on said carriage for permitting movement of successive packages longitudinally of said file, means for supporting said carriage, guide means for directing successive packages on said carriage into a desired line of movement while said packages are carried by said carriage, said supporting means including roller means for permitting free movement of said carriage laterally of said file whereby a package carried by said carriage may readily be moved laterally into said desired line by said guide means.

2. In apparatus for aligning packages, a carriage for receiving packages, conveyor means mounted on said carriage for permitting movement of successive packages in one direction with respect to said carriage, means for supporting said carriage, guide means for directing successive packages on said carriage laterally of said one direction into a desired line of movement while said packages are carried by said carriage, said supporting means permitting free movement of said carriage laterally of said one direction whereby a package carried by said carriage may readily be moved into said desired line of movement by said guide means, and means urging said carriage toward a neutral position laterally of said line of movement.

3. In apparatus for aligning packages moving generally in single file, a carriage for receiving packages of said file, conveyor means mounted on said carriage for permitting movement of successive packages longitudinally of said file, means for supporting said carriage, guide means for directing successive packages on said carriage into a desired line while said packages are carried by said carriage, said supporting means permitting free movement of said carriage laterally of said file whereby a package carried by said carriage may readily be moved laterally into said desired line by said guide means, and means urging said carriage toward a neutral position laterally of said file.

4. In apparatus for aligning packages moving generally in single file, a carriage for receiving packages of said file, roller means mounted on said carriage for permitting movement of successive packages longitudinally of said file, means for supporting said carriage, guide means for directing successive packages on said carriage into a desired line of movement while said packages are carried by said carriage, said supporting means including roller means for permitting free movement of said carriage laterally of said file whereby a package carried by said carriage may readily be moved laterally into said desired line by said guide means.

5. In apparatus for aligning packages moving generally in single file, a carriage for receiving packages of said file, roller means mounted on said carriage for permitting movement of successive packages longitudinally of said file, means for supporting said carriage, guide means for directing successive packages on said carriage into a desired line of movement while said packages are carried by said carriage, said supporting means including roller means for permitting free movement of said carriage laterally of said file whereby a package carried by said carriage may readily be moved laterally into said desired line by said guide means, and spring means urging said carriage toward a neutral position laterally of said file.

6. In apparatus for aligning packages, package support means for receiving packages seriatim and for permitting free movement of successive packages in one direction, guide means for directing successive packages on said support means laterally of said one direction into a desired line of movement while said packages are supported by said support means, said guide means including a pair of arms mounted for pivotal movement about respective axes which are parallel to each other and symmetrically spaced at opposite sides of said line of movement, link means connecting said arms for joint pivotal movement symmetrical with respect to said line of movement, and means urging the free ends of said arms toward said line of movement.

7. In apparatus for aligning packages moving generally in single file, a carriage for receiving packages of said file, roller means mounted on said carriage for permitting movement of successive packages longitudinally of said file, means for supporting said carriage, guide means for directing successive packages on said carriage into a desired line of movement while said packages are carried by said carriage, said guide means including a pair of arms mounted for pivotal movement about respective axes which are parallel to each other and symmetrically spaced at opposite sides of said line of movement, link means connecting said arms for joint pivotal movement symmetrical with respect to said line of movement, spring means urging the free ends of said arms toward said line of movement, said supporting means including roller means for permitting free movement of said carriage laterally of said file whereby a package carried by said carriage may readily be moved laterally into said desired line by said guide means, and spring means urging said carriage toward a neutral position laterally of said file, said first-mentioned spring means being sufficiently strong relative to said second-mentioned spring means that a package bearing against one of said guide arms will be guided laterally of said line of movement against the action of said second-mentioned spring means.

References Cited in the file of this patent

UNITED STATES PATENTS

| 707,951 | Alexander | Aug. 26, 1902 |
| 2,602,554 | Griffith | July 8, 1952 |
| 2,613,798 | McPhee | Oct. 14, 1952 |

FOREIGN PATENTS

| 796,711 | France | Apr. 14, 1936 |